United States Patent Office 3,849,508
Patented Nov. 19, 1974

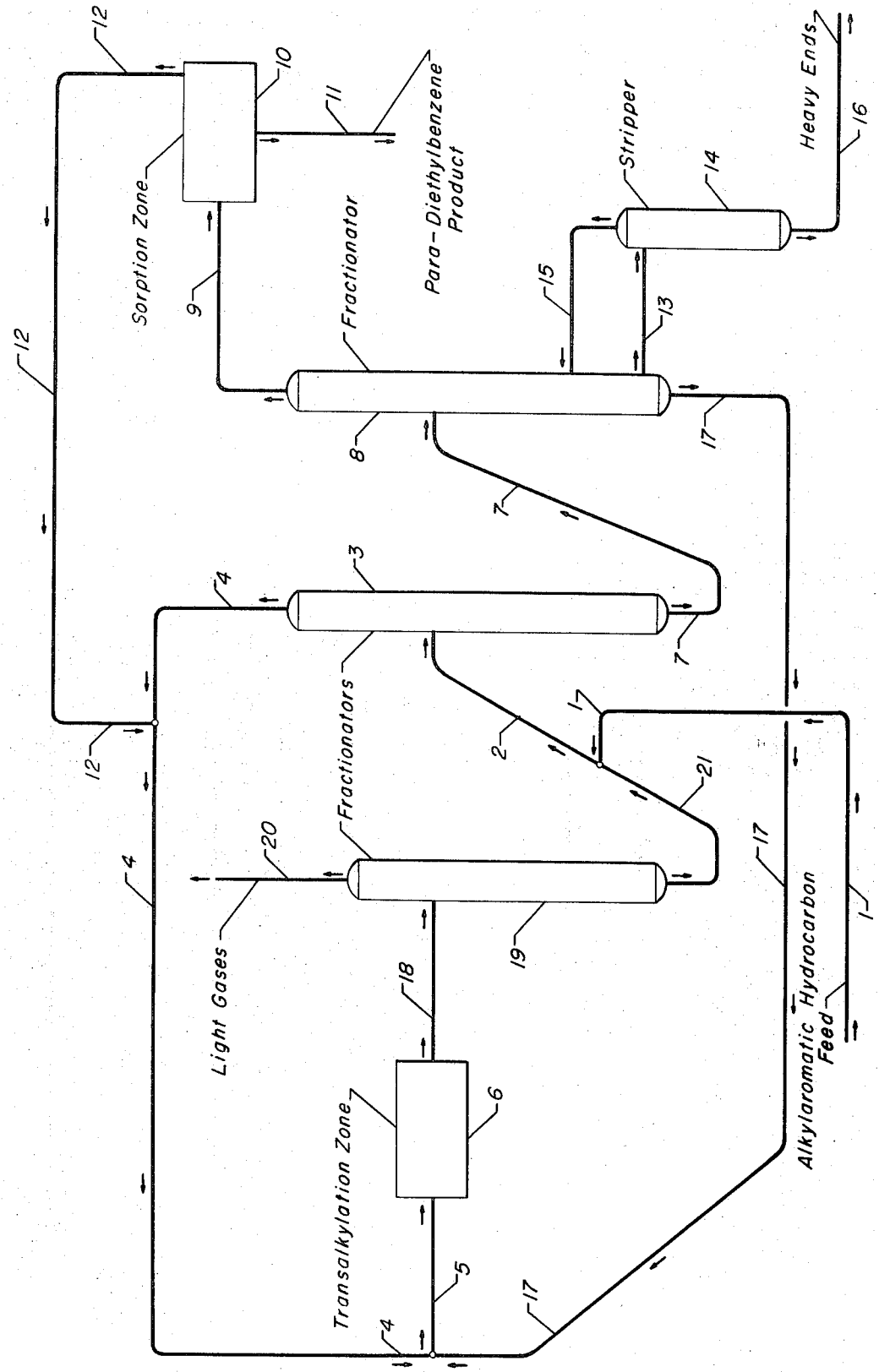

3,849,508
PROCESS FOR PRODUCING PARA-DIETHYL-
BENZENE
Harry M. Van Tassell, Arlington Heights, Ill., assignor to
Universal Oil Products Company, Des Plaines, Ill.
Filed Aug. 10, 1973, Ser. No. 387,395
Int. Cl. C07c 3/62
U.S. Cl. 260—672 T
9 Claims

ABSTRACT OF THE DISCLOSURE

A process for producing substantially pure para-diethylbenzene from a feedstock containing an alkylaromatic having from one to six ethyl group substituents. Effluent from a transalkylation unit, which contains benzene, para-diethylbenzene, metadiethylbenzene, ortho-diethylbenzene, and other alkylaromatics having from one to six ethyl group substituents, is admixed with fresh feedstock; the mixture of feedstock and transalkylation unit effluent is fractionated to provide a low-boiling stream containing benzene and ethylbenzene, an intermediate-boiling stream containing diethylbenzene isomers, and a high-boiling stream containing alkylaromatics having three or more ethyl group substituents; the low-boiling stream and the high-boiling stream are processed in the transalkylation operation to produce the above-mentioned para-diethylbenzene-containing transalkylation effluent; the intermediate-boiling stream is contacted with a crystalline aluminosilicate sorbent in a zeolitic adsorption-desorption operation to separate and recover para-diethylbenzene from the intermediate-boiling stream and to form a para-diethylbenzene-lean mixture comprising meta-diethylbenzene and ortho-diethylbenzene; and the mixture of meta- and ortho-diethylbenzene is charged to the transalkylation unit in admixture with the low-boiling stream and the high-boiling stream in order to form further para-diethylbenzene.

BACKGROUND OF THE INVENTION

This invention relates to a process for producing para-diethylbenzene. This invention relates more specifically to a process for producing para-diethylbenzene from an ethylenically substituted alkylaromatic using a combination of fractionation, transalkylation, and zeolitic separation of diethylbenzene isomers.

Para-diethylbenzene is known a valuable chemical substance having a variety of uses. Para-diethylbenzene is employed as a chemical building block in production of, e.g., plastics. Para-diethylbenzene also has utility as a particularly efficient desorbent substance in processes using crystalline aluminosilicate zeolitic adsorption-desorption operations to separate xylene isomers. The use of para-diethylbenzene in such xylene separation operations is described fully in U.S. Pat. 3,686,342. Para-diethylbenzene is substantially more valuable than are the other diethylbenzene isomers, meta-diethylbenzene and ortho-diethylbenzene; however, para-diethylbenzene is generally available commercially only in admixture with the less valuable meta- and ortho-diethylbenzene isomers. Since the three diethylbenzene isomers have normal boiling points within about 5° F. of each other, separation of para-diethylbenzene from the other diethylbenzene isomers by fractionation is economically infeasible. Separation of the diethylbenzene isomers by crystallization techniques is also known in the art to be difficult and expensive.

As used herein, the term "polyethylbenzene" refers to monocyclic alkylaromatics having three or more ethyl group substitutions of the benzene ring, i.e., the triethylbenzenes, tetraethylbenzenes, pentaethylbenzene, and hexaethylbenzene, and does not include para-diethylbenzene, meta-diethylbenzene, or ortho-diethylbenzene. As generally employed in the art and as used herein, the term "transalkylation" refers collectively to a combination of reactions which occur when an alkylaromatic hydrocarbon, which may or may not be admixed with other alkylaromatics or benzene, is contacted with certain catalysts at particular reaction conditions. For example, "transalkylation" includes disproportionation reactions undergone by alkylaromatic hydrocarbons, such as, for example, conversion of ethylbenzene into diethylbenzene and benzene. "Transalkylation" also includes such reactions as, for example, conversion of a mixture of benzene and tetraethylbenzene into diethylbenzenes. In general when a particular alkylaromatic is contacted with a transalkylation catalyst at transalkylation conditions, the particular alkylaromatic is converted into an essentially equilibrium mixture of benzene and all of the alkylaromatics having one to six alkyl substitutions, the exact number of alkylaromatic species produced depending upon the number of different alkyl group substituents in the alkylaromatic to be converted. Thus, for example, when a mixture of meta-diethylbenzene and ortho-diethylbenzene is contacted with a transalkylation catalyst at transalkylation conditions, the resulting product will include benzene, ethylbenzene, all three of the diethylbenzene isomers, and at least a small amount of all the polyethylbenzenes, especially the triethylbenzenes.

SUMMARY OF THE INVENTION

An object of this invention is to provide a method for obtaining substantially pure para-diethylbenzene from an ethylenically substituted alkylaromatic hydrocarbon feedstock.

Another object of this invention is to provide para-diethylbenzene by a combination of molecular sieve separation, transalkylation of alkylaromatics, and fractionation of a mixture comprising benzene and alkylaromatics containing from one to six ethylenic alkyl substitutions.

Another object of this invention is to provide an economical method for producing pure para-diethylbenzene from readily available alkylaromatic hydrocarbon feedstocks.

In an embodiment, the present invention relates to a process for producing a para-diethylbenzene product from a feedstock comprising one or more of the following hydrocarbons: ethylbenzene, diethylbenzenes, triethylbenzenes, tetraethylbenzenes, pentaethylbenzene or hexaethylbenzene, or any mixture thereof, the process comprising the steps of: admixing with the feedstock a transalkylation zone effluent comprising benzene, ethylbenzene, the three diethylbenzene isomers and polyethylbenzenes, this transalkylation zone effluent being formed as hereinafter specified, and fractionating the resulting mixture to provide a low-boiling stream comprising benzene and ethylbenzene, an intermediate-boiling stream comprising the three diethylbenzene isomers, and a high-boiling stream comprising polyethylbenzenes; contacting the low-boiling stream and the high-boiling stream with a transalkylation catalyst in a transalkylation zone at transalkylation conditions, contacting the intermediate-boiling stream with a zeolite crystalline aluminosilicate sorbent in a sorption zone at sorption conditions to separate the intermediate-boiling stream into a para-diethylbenzene stream and a para-diethylbenzene-lean meta-diethylbenzene - ortho - diethylbenzene stream; removing the para-diethylbenzene-lean meta-diethylbenzene - ortho - diethylbenzene stream from the sorption zone and contacting the meta-diethylbenzene-ortho-diethylbenzene stream with the transalkylation catalyst in the transalkylation zone at transalkylation conditions in admixture with the low-boiling stream and the high-boiling stream, and removing from the transalkylation zone the above-mentioned transalkylation zone effluent; and, removing the para-diethylbenzene stream from the sorption zone and recovering the para-diethylbenzene stream as the product of the process.

DESCRIPTION OF THE DRAWING

The attached drawing is a schematic representation of one of the embodiments of the process of this invention. The drawing illustrates one embodiment of the process, and the scope of the process is not limited thereto. Other embodiments and variations within the scope of the present invention will be apparent to those skilled in the art from the description of the drawing and the following detailed description of the invention.

Referring to the drawing, fresh alkylaromatic hydrocarbon feedstock is charged to the process through conduit 1 at the rate of 0.32 mole per hour of ethylbenzene, 0.06 mole per hour of $C_9$ alkylbenzenes, 0.23 mole per hour of $C_{10}$ alkylbenzenes, 1.28 mole per hour of para-diethylbenzene, 3.07 moles per hour of meta-diethylbenzene, 0.23 mole per hour ortho-diethylbenzene, 0.03 mole per hour of $C_{11}$ alkylaromatics and 0.47 mole per hour of triethylbenzene. The fresh feed is charged through conduit 1 into conduit 2 and mixed therein with alkylaromatic hydrocarbons charged into conduit 2 through conduit 21 at the rate of 0.32 mole per hour of benzene, 3.70 moles per hour of ethylbenzene, 0.15 mole per hour of $C_9$ alkylaromatics, 0.23 mole per hour of $C_{10}$ alkylaromatics, 3.82 moles per hour of para-diethylbenzene, 10.53 moles per hour of meta-diethylbenzene, 0.77 mole per hour of ortho-diethylbenzene, 0.09 mole per hour of $C_{11}$ alkylaromatics, 9.40 moles per hour of triethylbenzenes, and 1.35 mole per hour of heavy hydrocarbons. The mixture of hydrocarbons charged into conduit 2 is then passed to fractionation vessel 3. In vessel 3, the mixture charged is fractionated to provide an overhead stream containing primarily ethylbenzene and lighter hydrocarbons and a bottoms stream containing primarily diethylbenzenes and heavier hydrocarbons. The overhead from fractionator 3 is withdrawn through conduit 4 at the rate of 0.37 mole per hour of benzene, 4.02 moles per hour of ethylbenzene, 0.24 mole per hour of $C_9$ alkylaromatics, and 0.06 mole per hour of $C_{10}$ alkylaromatics.

The bottoms product from fractionation vessel 3 is withdrawn through conduit 7 at the rate of 0.40 mole per hour of $C_{10}$ alkylaromatics, 3.82 moles per hour para-diethylbenzene, 10.53 moles per hour of meta-diethylbenzene, 0.77 mole per hour of ortho-diethylbenzene, 0.09 mole per hour of $C_{11}$ alkylaromatics, 9.40 moles per hour of triethylbenzenes, and 1.35 mole per hour of heavy hydrocarbons. The bottoms from fractionator 3 are passed through conduit 7 into fractionation vessel 8. In fractionation vessel 8, the bottoms mixture from fractionator 3 is separated into an overhead containing primarily diethylbenzene isomers and bottoms containing primarily triethylbenzenes and heavier hydrocarbons. Overhead from fractionation vessel 8 is withdrawn through conduit 9 at the rate of 0.4 mole per hour of $C_{10}$ alkylaromatics, 5.1 moles per hour of para-diethylbenzene, 13.6 moles per hour of meta-diethylbenzene, and 1.0 mole per hour of ortho-diethylbenzene. The overhead from fractionator 8 is passed through conduit 9 into sorption zone 10. In sorption zone 10, the overhead stream from conduit 9 is contacted with a type Y zeolite sorbent ion exchanged to contain a combination of barium and potassium cations. Para-diethylbenzene is selectively adsorbed, and meta- and ortho-diethylbenzene are rejected by the sorbent. The raffinate, a para-diethylbenzene-lean mixture of meta- and ortho-diethylbenzene, is withdrawn from sorption zone 10 through conduit 12 at the rate of 0.4 mole per hour of $C_{10}$ alkylaromatics, 0.5 mole per hour of para-diethylbenzene, 13.5 moles per hour of meta-diethylbenzene, and 1 mole per hour of ortho-diethylbenzene.

The para-diethylbenzene-lean raffinate stream in conduit 12 is passed into conduit 4 in admixture with the overhead stream from fractionator 3. The mixture of hydrocarbons in conduit 4 is then passed to conduit 5. Referring again to sorption zone 10, para-diethylbenzene is desorbed from the crystalline aluminosilicate sorbent and the product stream of para-diethylbenzene is withdrawn from sorption zone 10 through conduit 11 at the rate of 4.6 moles per hour of para-diethylbenzene and 0.1 mole per hour of meta-diethylbenzene. The product stream is then removed from the process. Referring to fractionation vessel 8, a side cut is withdrawn from fractionation vessel 8 through conduit 13 and passed into stripping vessel 14. Stripper 14 is utilized to remove heavy hydrocarbons such as diphenylethane from the process stream, in order to avoid buildup of heavy hydrocarbon ends which are produced in small quantities in the transalkylation operation and may be introduced in small quantities with fresh feed. Lighter hydrocarbons, e.g., trialkylbenzenes, etc., are withdrawn overhead from stripper 14 and are passed back into fractionation vessel 8. Heavy ends are withdrawn from the bottom of stripper 14 through conduit 16 at the rate of 0.17 mole per hour of triethylbenzenes and 0.45 mole per hour of miscellaneous heavy hydrocarbons. The heavy ends removed from stripper 14 through conduit 16 are withdrawn from the operation. A bottoms stream is recovered from fractionation vessel 8 through conduit 17 at the rate of 0.12 mole per hour of $C_{11}$ alkylaromatics, 9.70 moles per hour of triethylbenzenes, and 0.90 mole per hour of miscellaneous heavy hydrocarbons. The bottoms stream removed from fractionation vessel 8 in conduit 17 is passed into conduit 5 in admixture with the hydrocarbons from conduit 4.

Hydrocarbons are passed through conduit 5 into transalkylation zone 6 at the rate of 0.37 mole per hour of benzene, 4.02 moles per hour of ethylbenzene, 0.24 mole per hour of $C_9$ alkylaromatics, 0.46 mole per hour of $C_{10}$ alkylaromatics, 0.50 mole per hour of para-diethylbenzene, 13.50 moles per hour of meta-diethylbenzene, 1.00 mole per hour of ortho-diethylbenzene, 0.12 mole per hour of $C_{11}$ alkylaromatics, 9.70 moles per hour of triethylbenzenes, and 0.90 mole per hour of miscellaneous heavy hydrocarbons. In transalkylation zone 6, the hydrocarbons charged through conduit 5 are contacted with a boron trifluoride-modified substantially anhydrous alumina transalkylation catalyst. A liquid hourly space velocity of about 1.6 is maintained in transalkylation zone 6. Transalkylation conditions in transalkylation zone 6 includes a temperature of about 400° F., a pressure of about 20 atmospheres, and a liquid hourly space velocity of about 2. The effluent from transalkylation zone 6 is withdrawn through conduit 18 at the rate of 0.06 mole per hour of $C_4$ hydrocarbons, 0.67 mole per hour of benzene, 3.70 moles per hour of ethylbenzene, 0.15 mole per hour of $C_9$ alkylaromatics, 0.23 mole per hour of $C_{10}$ alkylaromatics, 3.82 moles per hour of para-diethylbenzene, 10.53 moles per hour of meta-diethylbenzene, 0.77 mole per hour of ortho-diethylbenzene, 0.09 mole per hour of $C_{11}$ alkylaromatics, 9.40 moles per hour of triethylbenzenes, and 1.35 mole per hour of miscellaneous heavy hydrocarbons. In the embodiment depicted in the drawing, the effluent from transalkylation zone 6 is passed into optional fractionation vessel 19 via conduit 18 in order to withdraw light gases from the process to prevent buildup.

Fractionation vessel 19 is not essential to the operation of the present process, and the same function may be formed through the use of fractionation vessel 3 modified in a manner which will be apparent to those skilled in the art. In the embodiment depicted in the drawing, the transalkylation zone effluent is passed into fractionation vessel 19 through conduit 18 and an overhead containing 0.06 mole per hour of $C_4$ hydrocarbons and 0.35 mole per hour of benzene is withdrawn from vessel 19 through conduit 20. A bottoms product from vessel 19 is withdrawn through conduit 21, at the rate specified in the foregoing description, and admixed with fresh feed from conduit 1 as described above. Various standard ancillary equipment and modifications of the described fractionation, transalkylation and zeolitic separation operations are not shown in the drawing and have not been described in the foregoing. Such modifications and ancillary items, such as reboiling means, refluxing means, pumps, heat exchangers, etc., and their use in the various steps of the process as shown in the drawing will be apparent to those skilled in the art from the foregoing description.

DETAILED DESCRIPTION OF THE INVENTION

The hydrocarbon feedstocks which may suitably be employed in the process of the present invention include, in general, aromatic hydrocarbon fractions containing substantial amounts of one or more of the following hydrocarbons: ethylbenzene, para-, meta- or ortho-diethylbenzene, any triethylbenzene isomer, any tetraethylbenzene isomer, pentaethylbenzene, and hexaethylbenzene. Suitable hydrocarbon fractions are most readily commercially available as by-product streams which are recovered from operations for producing styrene from benzene and ethylene. Typically, in such styrene production operations, benzene is alkylated with ethylene in order to produce the desired primary alkylation reaction product, ethylbenzene. The ethylbenzene thus produced is then separated from by-product alkylaromatic hydrocarbons also produced in the alkylation operation, by fractionation, and the ethylbenzene is passed to a dehydrogenation operation in order to form styrene. The by-product streams which are produced in the alkylation operation may contain substantial amounts of the diethylbenzene isomers and polyethylbenzenes, as well as minor amounts of such other alkylaromatics as methylethylbenzene, isopropylbenzene, butylbenzene, etc. The make up of any particular feedstock to be used in the present process, when such feedstock is derived from a styrene production operation, will depend upon the exact fractionation capabilities available to provide a relatively pure supply of the desired ethylenically substituted alkylaromatic hydrocarbons suitable for use in this process. Thus, feedstocks which contain substantial amounts of benzene, ethylbenzene and polyethylbenzene, as well as diethylbenzene isomers may be employed.

The product of the present process is substantially pure para-diethylbenzene. Heretofore, it has not been commercially practical to provide any one of the diethylbenzene isomers in substantially pure form. The normal boiling points of para-diethylbenzene, meta-diethylbenzene, and ortho-diethylbenzene, are, respectively, about 362.8° F., 358.0° F. and 362.2° F. The relatively small differences in the boiling points of the diethylbenzene isomers have heretofore made separation of any one of them by conventional fractionation practically impossible. Crystallization techniques for separating diethylbenzene isomers have also been found to be unduly expensive and complicated to operate. The process of the present invention, utilizing fractionation, molecular sieve separation and transalkylation, provides a method, not only for recovering pure para-diethylbenzene, but also for converting the other diethylbenzene isomers and other ethylenically substituted alkylaromatics, into a pure para-diethylbenzene product. Generally, the present process can provide para-diethylbenzene in substantial quantities as pure as 99 mole percent para-diethylbenzene, and the present process is often capable of producing para-diethylbenzene at purities as high as 99.5 mole percent, or higher.

The first essential step in the process of this invention is the separation of fresh feedstock, in admixture with effluent hydrocarbons from the transalkylation operation described hereinafter, through the use of conventional fractionation, in order to provide a heart-cut, or intermediate-boiling stream, containing primarily para-diethylbenzene, meta-diethylbenzene, and ortho-diethylbenzene. This separation operation may be performed using one or more fractionation columns. As described above, the fresh feedstocks which may be employed in the present process may contain benzene, ethylbenzene, the three diethylbenzene isomers, and/or polyethylbenzenes. Further, as described hereinafter in greater detail, the transalkylation operation employed in the process of the present invention produces a product, effluent mixture of hydrocarbons which contains in addition to the three diethylbenzene isomers, benzene, ethylbenzene and polyethylbenzenes, small amounts of light aliphatic hydrocarbons, such as butane, and small amounts of heavy ends such as diphenylethane, and similar hydrocarbons of very high boiling point.

Thus, when the fresh feed and the hydrocarbon effluent from the transalkylation operation are admixed and fractionated in order to produce an intermediate-boiling fraction containing the three diethylbenzene isomers, there are also produced a low-boiling fraction comprising any light aliphatics, benzene, and ethylbenzene, and also a high-boiling fraction comprising polyethylbenzenes and the heavy ends. As will be apparent to those skilled in the art, one or more separate fractionation vessels and operations may be employed, if desired, to separate the intermediate-boiling diethylbenzenes fraction, the low-boiling fraction and the high-boiling fraction. For example, the intermediate-boiling diethylbenzene isomers stream may be withdrawn as a side cut from a single large fractionation vessel, with the low-boiling stream recovered overhead and the high-boiling stream recovered as a bottoms product. Alternatively, in a preferred embodiment, two separate fractionation vessels may be employed, with the low-boiling hydrocarbons being recovered overhead from the first fractionation vessel, and the bottoms from the first fractionation vessel being further fractionated in a second fractionation vessel. The overhead from the second fractionation vessel will then comprise the diethylbenzene intermediate-fraction while the bottoms from the second fractionation operation will comprise the high-boiling stream, i.e., polyethylbenzenes and heavy ends.

As used herein, the term "low-boiling stream" refers to the combination of one or more hydrocarbon streams recovered in this fractionation step which have boiling ranges below the boiling range of the heart-cut which contains the diethylbenzene isomers. Thus, the low-boiling stream may be recovered in a single stream as a mixture comprising light aliphatics, benzene, and ethylbenzene, or these components may each be separately recovered from separate fractionation vessels, depending upon the fractionation operation and vessels employed. Generally, it is preferred to recover all the aromatic components of the low-boiling stream as a single overhead product stream from a single fractionation column. Similarly, the term "high-boiling stream," as used herein, refers to the combination of one or more hydrocarbons derived in the fractionation operation which have boiling ranges above the boiling range of the heart-cut which contains the diethylbenzene isomers. Thus, the high-boiling stream may be recovered as a mixture comprising triethylbenzenes, tetraethylbenzenes, pentaethylbenzene, hexaethylbenzene and heavy ends, or one or more of these components may be recovered as separate streams, dependng upon the particular fractionation scheme employed. Generally, it is preferred to recover at least the aromatic components of the high-boiling stream as a single bottoms product stream from a single fractionation column.

The term "intermediate-boiling stream," as used herein, refers to the heart-cut from the fractionation operation, which essentially comprises the diethylbenzene isomers which are present in the fresh feedstock and which are formed in the transalkylation step. The intermediate-boiling stream may also contain minor amounts of other hydrocarbons having boiling points similar to those of the diethylbenzene isomers, as a result of imprecise fractionation. In addition to the one or more fractionation vessels which may be utilized to provide the low-boiling stream containing ethylbenzene and lighter hydrocarbons, the intermediate-boiling stream containing the three diethylbenzene isomers, and the high-boiling stream containing polyethylbenzenes and heavy ends, it may also be desirable to further process a portion of the high-boiling stream in order to remove some of the heavy ends, such as diphenylethane. Such heavy end materials would otherwise build up within the process in excessive amounts. The heavy ends may also be controlled by simply withdrawing a portion of the high-boiling stream from the process as a drag stream. Likewise, it may also be desirable to treat the low-boiling stream to remove any light aliphatic hydrocarbons, such as butane, which may otherwise build up to excessive amounts within the process.

The intermediate-boiling stream, or heart-cut, which is recovered from the fractionation operation described above, is passed to a sorption zone for further separation in order to recover pure para-diethylbenzene and to provide a para-diethylbenzene-lean stream containing meta-diethylbenzene and ortho-diethylbenzene which is utilized as a charge to the transalkylation step. In the sorption zone, the intermediate-boiling stream is contacted with a zeolitic crystalline aluminosilicate sorbent which selectively either (1) adsorbs para-diethylbenzene and rejects meta-diethylbenzene and ortho-diethylbenzene, or (2) adsorbs meta-diethylbenzene and ortho-diethylbenzene and rejects para-diethylbenzene. The rejected component, conventionally termed "raffinate," is then withdrawn from the sorption zone. The component which is adsorbed in the crystalline aluminosilicate is subsequently desorbed, separated from any desorbent substance, if one is used, and removed from the sorption zone. The scope of the zeolitic separation step in the present process includes both embodiments wherein para-diethylbenzene is preferentially adsorbed onto the crystalline aluminosilicate and also embodiments wherein the meta-diethylbenzene and ortho-diethylbenzene isomers are preferentially adsorbed onto the crystalline aluminosilicate.

Any zeolitic crystalline aluminosilicate sorbent which (1) selectively adsorbs para-diethylbenzene relative to meta-diethylbenzene and ortho-diethylbenzene, or (2) selectively adsorbs meta-diethylbenzene and ortho-diethylbenzene relative to para-diethylbenzene may be employed as the sorbent in the present process. Crystalline aluminosilicate sorbents suitable for use include, for example, type X and type Y structured zeolites which contain selected cations at exchangeable cationic sites within the crystalline structure of the sorbents. A more detailed description of representative zeolites which may be utilized with suitable modifications as the sorbent in this process may be found in U.S. Pat. 2,882,244 and U.S. Pat. 3,130,007. Such crystalline aluminosilicate sorbents may be composited with binder materials such as clay in order to provide particles of a size which are convenient for use in the sorption operation. Both natural and synthetic crystalline aluminosilicates may be used in the separation operation. As originally prepared or naturally occurring, such zeolites are made up of a crystalline cage-like structure which is built up from $AlO_4$ and $SiO_4$ tetrahedra, with the interior of the cages occupied by water molecules.

Electrochemical neutrality in the zeolite is preserved by the association of a cation, normally sodium, with each $AlO_4$ tetrahedron in the zeolite structure. When the zeolite is dehydrated, for example, by calcination, the crystalline cage-like network in the zeolite is preserved, resulting in a well denned structure of pores and channels which are approximately molecular dimensions. Prior to such dehydration, the cation content of these crystalline aluminosilicates may be modified by the substitution of one or more cations for the original cation, which is usually sodium. For example, such cations as potassium and barium, etc., may be exchanged into the zeolite structure at exchangeable sites. Methods for ion-exchanging various cations into the structure of these crystalline aluminoslicates are well known in the art. The preferred zeolites for use in the present process as the sorbent include, as stated above, the type X and type Y structured zeolite sorbents. The sorbents which are useful in the separation operation of the present process contain, at their ion-exchangeable sites, one or more cations from the group of potassium, rubidium, cesium, barium, copper, silver, lithium, sodium, beryllium, magnesium, calcium, strontium, cadmium, cobalt, nickel, manganese and zinc, or combinations thereof.

Zeolites containing a single species of ions which are selective in adsorbing para-diethylbenzene include zeolites containing one cation from the group of potassium, rubidium, cesium, silver, or barium. Zeolites containing a single species of cations which are selective in adsorbing meta- and ortho-diethylbenzene include zeolites which contain one cation from the group of lithium sodium, beryllium, magnesium, calcium, strontium, manganese, cadmium, and copper. Particularly preferred as the zeolitic sorbent in the present process is a type X structured or type Y structured crystalline aluminosilicate containing a combination of potassium cations and barium cations, which is particularly selective is adsorbing para-diethylbenzene.

The overall zeolitic separation operation may be performed in either a batch-type system or a continuous fixed-bed or moving-bed system. In a batch-type operation, a fixed amount of the intermediate-boiling stream is passed into a chamber which contains a fixed quantity of the crystalline aluminosilicate sorbent and the intermediate-boiling stream is allowed to contact the sorbent for a predetermined time. Hydrocarbons which have not been adsorbed into the sorbent, i.e., the raffinate materials, are then purged out of the chamber. The purging may be accomplished by gravity separation, pressurization, etc. A desorbent material may then be passed into the chamber in order to remove the adsorbed component from the crystalline aluminosilicate sorbent. Alternatively, the adsorbed component may be removed from the crystalline aluminosilicate sorbent by subjecting the sorbent to heat and/or low pressures.

Examples of suitable desorbents which may be used to desorb the preferentially adsorbed diethylbenzene isomer, or isomers, in the present process, include benzene, toluene, ethylbenzene, etc. In order to be suitable for use in the present process, a desorbent must be easily separated from the diethylbenzenes by simple fractionation, i.e., the desorbent must have a boiling point or boiling range sufficiently different from the diethylbenzenes. The desorbents which may be used include mixtures of either higher or lower boiling point materials, relative to the diethylbenzenes. Other suitable desorbents may contain two or more components having both higher boiling points and lower boiling points than the diethylbenzene isomers. In a continuous fixed-bed or moving-bed system, which are preferred for use in the present process, adsorption and desorption take place continuously. This allows continuous use of the intermediate-boiling stream in the sorption zone and allows continuous production of para-diethylbenzene. Examples of suitable continuous systems may be found in U.S. Pat. 3,374,099 and U.S. Pat. 3,310,486.

Sorption conditions in the present process may include either vapor-phase or liquid-phase operations. Liquid-phase operations in the sorption zone are preferred because of the lower heat requirements and the improved sorbent selectively which are associated with low temperatures. Sorption conditions generally include a temperature of about 50° F. to about 500° F. and a pressure in the range from about 1 atmosphere to about 35 atmospheres or more. It is preferred to employ pressures in the sorption zone which are below about 35 atmospheres because of the obvious economic advantages associated with low pressure operations. Desorption of the selectively adsorbed component, in addition to, or as a substitute for, use of the desorbents described above, may be effected by reduced pressures or elevated temperatures or a combination thereof. For example, vacuum purging of a sorbent to remove the adsorbed component from the sorbent may be utilized. Alternatively, the sorbent may be heated to drive the adsorbed component off from the sorbent as a vapor. In general, the intermediate-boiling stream, which is recovered from the fractionation step as previously described, is contacted with a suitable crystalline aluminosilicate sorbent, and depending upon the particular crystalline aluminosilicate which is utilized, either para-diethylbenzene or a mixture of ortho-diethylbenzene and meta-diethylbenzene will be preferentially adsorbed.

Subsequently, the non-adsorbed raffinate material is withdrawn from contact with the sorbent. In embodiments wherein para-diethylbenzene is preferentially adsorbed on the crystalline aluminosilicate, the non-adsorbed components, or raffinate, include ortho-diethylbenzene and meta-diethylbenzene. After the para-diethylbenzene-lean raffinate has been withdrawn from contact with the sorbent, the adsorbed component, para-diethylbenzene, is subsequently desorbed by utilizing one or more of the above described desorbents, or by other means, and is thus separated from the crystalline aluminosilicate sorbent and recovered as the product of the process. Similarly, in an embodiment wherein ortho-diethylbenzene and meta-diethylbenzene are preferentially adsorbed into the crystalline aluminosilicate sorbent, relative to para-diethylbenzene, the raffinate will comprise para-diethylbenzene. Raffinate is withdrawn from contact with the crystalline aluminosilicate and the para-diethylbenzene thus withdrawn is recovered as the product of the process. The adsorbed ortho-diethylbenzene and meta-diethylbenzene are then desorbed utilizing one or more of the above described desorbents, or by other means, and separated from the desorbent, if one is used, in order to form the para-diethylbenzene-lean meta - diethylbenzene - ortho-diethylbenzene stream which is charged to the transalkylation operation.

The para-diethylbenzene product is removed from the zeolitic separation unit in substantially pure form, irrespective to the specific sorbent employed, and is then recovered from the process. The para-diethylbenzene-lean mixture of meta-diethylbenzene and ortho-diethylbenzene recovered from the zeolitic separation unit is passed for further processing to the transalkylation operation, described below, where this meta-diethylbenzene-ortho-diethylbenzene stream is processed in admixture with the low-boiling stream and the high-boiling stream which are produced, as described above, in the fractionation operation. The low-boiling stream, the high-boiling stream and the para-diethylbenzene-lean mixture of meta- and ortho-diethylbenzene recovered from the zeolitic separation step may all be commingled together and subsequently passed to the transalkylation operation, or the three streams may be separately passed thereto or any combination of two of the three may be commingled and subsequenly passed to the transalkylation operation.

Suitable transalkylation catalysts for use in the transalkylation operation of the present process are generally those transalkylation catalysts known in the art. For example, Friedel-Crafts metal halides such as aluminum chloride have been utilized and are suitable for use in the present process. Hydrogen halides, boron halides, Group I–A metal halides, iron group metal halides, etc., have been found suitable. Refractory inorganic oxides, combined with the above-mentioned and other known catalytic materials, have also been found useful. For example, various forms of alumina, including gamma-alumina and eta-alumina, as well as silica, magnesia, zirconia, etc., may be utilized. Crystalline aluminosilicates have also been employed as transalkylation catalysts. These include for example, faujasites, mordenite, etc., and these may suitably be employed in the present process if desired, alone or combined with one or more metals impregnated or ion-exchanged thereon.

Other materials suitable as transalkylation catalysts for use in the present process include combinations of inorganic oxides with metals such as those in Group VIII of the Periodic Table and mixtures or compounds of inorganic oxides with rare earth metals. The above-mentioned suitable materials are noted as examples only and are not meant to constitute a complete list of suitable transalkylation catalysts. Persons skilled in the art will recognize that a large number of suitable catalysts exist which may be employed as a transalkylation catalyst within the scope of this invention, but that the results will not necessarily be equivalent to the results obtained by use of the preferred catalyst described below.

A preferred transalkylation catalyst for use in the present process is a boron trihalide-modified refractory inorganic oxide, for example, a boron trifluoride-modified gamma- or theta-alumina. Suitable inorganic oxides, in addition to the above-mentioned aluminas, include silica, titania, zirconia, chromia, magnesia, zinc oxide, calcium oxide, etc. The preferred boron trifluoride-modified alumina catalyst may be prepared by drying and calcining alumina and subsequently contacted the alumina with from about 2 weight percent to about 100 weight percent of boron trifluoride, based on the alumina, at a temperature below about 600° F. Alternatively, boron trifluoride may be added to a hydrocarbon stream which is to be charged to a transalkylation zone and charged therewith to the transalkylation zone, in which is placed a fixed bed of dried and calcined alumina. A more detailed description of the preparation and use of boron trihalide-modified refractory inorganic oxides may be found in U.S. Pat. 2,939,890, U.S. Pat. 3,054,835, and U.S. Pat. 3,068,301. Generally, in a transalkylation operation utilizing the preferred boron trifluoride-modified alumina as the transalkylation catalyst, boron trifluoride is continuously charged in small amounts to the transalkylation zone in admixture with the hydrocarbons to be reacted and the boron trifluoride is subsequently recovered from the effluent from the transalkylation zone for further use. This method of operation is preferred for use in the present process.

Transalkylation conditions employed in the present process are those employed in prior art in connection with the particular transalkylation catalyst utilized. Tranalkylation conditions employed in conjunction with the preferred boron trifluoride-modified alumina catalyst in the transalkylation operation include a temperature in the range from about 200° F. to about 600° F., preferably from about 300° F. to about 450° F. and a pressure in the range from about 1 atmosphere to about 200 atmospheres or more, preferably about 10 atmospheres to about 40 atmospheres. A liquid hourly space velocity (LHSV, defined as the volume flow rate per hour of hydrocarbons charged divided by the volume of catalyst employed) between about 0.5 and about 5 is preferably employed. The transalkylation step in the present process may be embodied in batch-type reaction scheme or a continuous-type reaction scheme. A continuous scheme is preferred, wherein the transalkylation catalyst is employed as a fixed bed in the transalkylation zone and the hydrocarbon stream is continuously charged to the transalkylation reactor, passed over the catalyst bed, and withdrawn. A large variety of vessels suitable for use as a transalkylation zone, or reactor, are well known in the art. Such vessels may be equipped with heating means, baffles, trays, packings, etc.

EXAMPLE

As an illustration of the operation of the transalkylation step in the present process, the following procedure was undertaken. A charge stock (similar to the mixture of meta-diethylbenzene and ortho-diethylbenzene recovered from the zeolitic separation step of the process of the present invention) was obtained and analyzed. It was found to contain 80.2 weight percent meta-diethylbenzene, 11.5 weight percent ortho-diethylbenzene and 7.5 weight percent butylbenzenes. This charge stock was processed in a conventional transalkylation reactor using a conventional boron trifluoride-modified alumina catalyst. Transalkylation conditions in the operation included a temperature of 400° F., a pressure of about 34 atmospheres and a LHSV of 1.0. The effluent from the transalkylation reactor was collected and analyzed. It was found to have the following composition: light ends (hydrocarbons boiling lower than benzene) 0.7 weight percent, benzene 1.9 weight percent, ethylbenzene 18.8 weight percent, $C_9$ alkylaromatics 0.2 weight percent, butylbenzenes 1.3 weight percent, meta-diethylbenzene 31.5 weight percent, para-diethylbenzene 13.3 weight percent, ortho-diethylbenzene 3.2 weight percent, other diethylbenzene-boiling-range hydrocarbons 0.6 weight percent, triethylbenzenes 23.7 weight percent, other triethylbenzene-boiling-range hydrocarbons 2.0 weight percent and heavier hydrocarbons 2.8 weight percent.

As is apparent from the foregoing example, the effluent from the transalkylation step in the present process generally comprises a mixture of benzene and mono-, di-, and triethylbenzenes, with smaller amounts of lighter and heavier hydrocarbons. When the preferred transalkylation catalyst, boron trifluoride-modified alumina, is employed as the transalkylation catalyst, it may be desirable to add a small amount of boron trifluoride to the hydrocarbons which are charged to the transalkylation reactor, in order to ensure catalyst stability. If such boron trifluoride addition is contemplated, provision for recovery of boron trifluoride from the transalkylation reactor effluent should be made. Such provisions can be made in a manner well known to the art. For example, by fractionating the transalkylation zone effluent to take overhead light aliphatic gases, boron trifluoride and possibly some benzene, the boron trifluoride in the transalkylation reactor effluent can conveniently be removed from the transalkylation reactor effluent stream. Any benzene thus removed may be recycled directly to the transalkylation reactor along with the low-boiling stream recovered from the fractionation step of the present process, previously described. After any necessary purification, such as removal of boron trifluoride, etc., the effluent from the transalkylation reactor is commingled with fresh diethylbenzene isomers feedstock, as previously described, and is passed to the fractionation operation in order to obtain the above described low-boiling stream, intermediate-boiling stream, and high-boiling stream.

I claim as my invention:

1. A process for producing a para-diethylbenzene product from a hydrocarbon feedstock comprising an alkylaromatic hydrocarbon selected from the group consisting of ethylbenzene, diethylbenzenes, triethylbenzenes, tetraethylbenzenes, pentaethylbenzene and hexaethylbenzens, which comprises the steps of:

(a) admixing with said feedstock at least a portion of a transalkylation zone effluent comprising benzene, ethylbenzene, para-diethylbenzene, meta-diethylbenzene, ortho-diethylbenzene and polyethylbenzenes, said effluent being formed as hereinafter specified, and separating at least a portion of the resulting mixture to provide a low-boiling stream comprising benzene and ethylbenzene, an intermediate-boiling stream comprising para-diethylbenzene, meta-diethylbenzene and orthodiethylbenzene, and a high-boiling stream comprising polyethylbenzenes;

(b) contacting at least a portion of said intermediate-boiling stream with a zeolitic crystalline aluminosilicate sorbent in a sorption zone at sorption conditions to separate paradiethylbenzene from said intermediate-boiling stream and form a para-diethylbenzene-lean stream comprising meta-diethylbenzene and ortho-diethylbenzene, and recovering the resulting separated para-diethylbenzene from said sorption zone as said product;

(c) removing said para-diethylbenzene-lean stream from said sorption zone, contacting at least a portion of said paradiethylbenzene-lean stream, at least a portion of said high-boiling stream and at least a portion of said low-boiling stream with a transalkylation catalyst in a transalkylation zone at transalkylation conditions, and removing from said transalkylation zone said transalkylation zone effluent.

2. The process of claim 1 wherein said transalkylation catalyst is a boron halide-modified inorganic oxide.

3. The process of claim 2 wherein said transalkylation catalyst is a boron trifluoride-modified substantially anhydrous alumina.

4. The process of claim 1 wherein said transalkylation catalyst is a Friedel-Crafts metal halide.

5. The process of claim 4 wherein said Friedel-Crafts metal halide is aluminum chloride.

6. The process of claim 1 wherein said transalkylation catalyst comprised a crystalline aluminosilicate.

7. The process of claim 1 wherein said crystalline aluminosilicate sorbent is selected from the group consisting of type X structured and type Y structured zeolites.

8. The process of claim 7 wherein said zeolite contains at least one cation selected from the group consisting of barium and potassium at ion exchangeable sites in said zeolite.

9. The process of claim 1 wherein at least a portion of said resulting mixture, formed in Step (a) from said feedstock and at least a portion of said transalkylation zone effluent, is fractionated to provide a first overhead stream comprising benzene and ethylbenzene and a first bottoms stream comprising para-diethylbenzene, meta-diethylbenzene, ortho-diethylbenzene and polyethylbenzenes, at least a portion of said first overhead stream is utilized as said low-boiling stream, at least a portion of said first bottoms stream is fractionated to provide a second overhead stream comprising para-diethylbenzene, meta-diethylbenzene and ortho-diethylbenzene and a second bottoms stream comprising polyethylbenzenes, at least a portion of said second overhead stream is utilized as said intermediate-boiling stream and at least a portion of said second bottoms stream is utilized as said high-boiling stream.

References Cited

UNITED STATES PATENTS

| | | | |
|---|---|---|---|
| 3,551,510 | 12/1970 | Pollitzer et al. | 265—672 T |
| 3,763,260 | 10/1973 | Pollitzer | 260—672 T |
| 3,636,180 | 1/1972 | Broughton | 260—674 SA |
| 3,527,824 | 9/1970 | Pollitzer | 260—672 T |
| 3,562,345 | 2/1971 | Mitsche | 260—672 T |
| 3,629,350 | 12/1971 | Mocearov et al. | 260—672 T |
| 3,699,181 | 10/1972 | Kmecak et al. | 260—672 T |

CURTIS R. DAVIS, Primary Examiner

U.S. Cl. X.R.

260—674 SA